US00RE41850E

(19) United States
(12) Reissued Patent
Figueroa

(10) Patent Number: US RE41,850 E
(45) Date of Reissued Patent: Oct. 26, 2010

(54) CHAIR

(75) Inventor: Daniel Figueroa, Bad Münder (DE)

(73) Assignee: Dauphin Entwicklungs-u. Beteiligungs GmbH, Hersbruck (DE)

(21) Appl. No.: 29/356,432

(22) Filed: Feb. 25, 2010

Related U.S. Patent Documents

Reissue of:
(64) Patent No.: Des. 606,770
Issued: Dec. 29, 2009
Appl. No.: 29/335,682
Filed: Apr. 20, 2009

(30) Foreign Application Priority Data

Oct. 20, 2008 (WO) ..... 465 259 001

(51) LOC (9) Cl. ..... 06 01
(52) U.S. Cl. ..... D6/372
(58) Field of Classification Search ..... D6/334–336, D6/371, 372, 373, 374, 379, 380, 499, 500–502; 297/411.42, 445.1, 446.1, 447.1, 448.2, 451.3, 297/451.7, 452.18, 452.2
See application file for complete search history.

(56) References Cited

U.S. PATENT DOCUMENTS

D250,559 S 12/1978 Petersen
D274,579 S * 7/1984 Diffrient ..... D6/372
D301,810 S * 6/1989 Snodgrass ..... D6/373
D508,792 S 8/2005 Dorigo
D572,927 S 7/2008 Bernett et al.
D579,225 S 10/2008 Citterio
D606,770 S * 12/2009 Figueroa ..... D6/372
2008/0036267 A1 * 2/2008 Maier et al. ..... 297/452.18

* cited by examiner

*Primary Examiner*—Mimosa De
(74) *Attorney, Agent, or Firm*—Browdy and Neimark, PLLC

(57) CLAIM

The ornamental design for a chair, as shown and described.

DESCRIPTION

FIG. 1 is a top view of a chair, showing my new design;
FIG. 2 is a bottom view thereof;
FIG. 3 is a lateral view (right side) thereof;
FIG. 4 is a lateral view (left side) thereof;
FIG. 5 is a rear view thereof;
FIG. 6 is a front view thereof; and,
FIG. 7 is a perspective view thereof.

1 Claim, 7 Drawing Sheets

Figure 1:
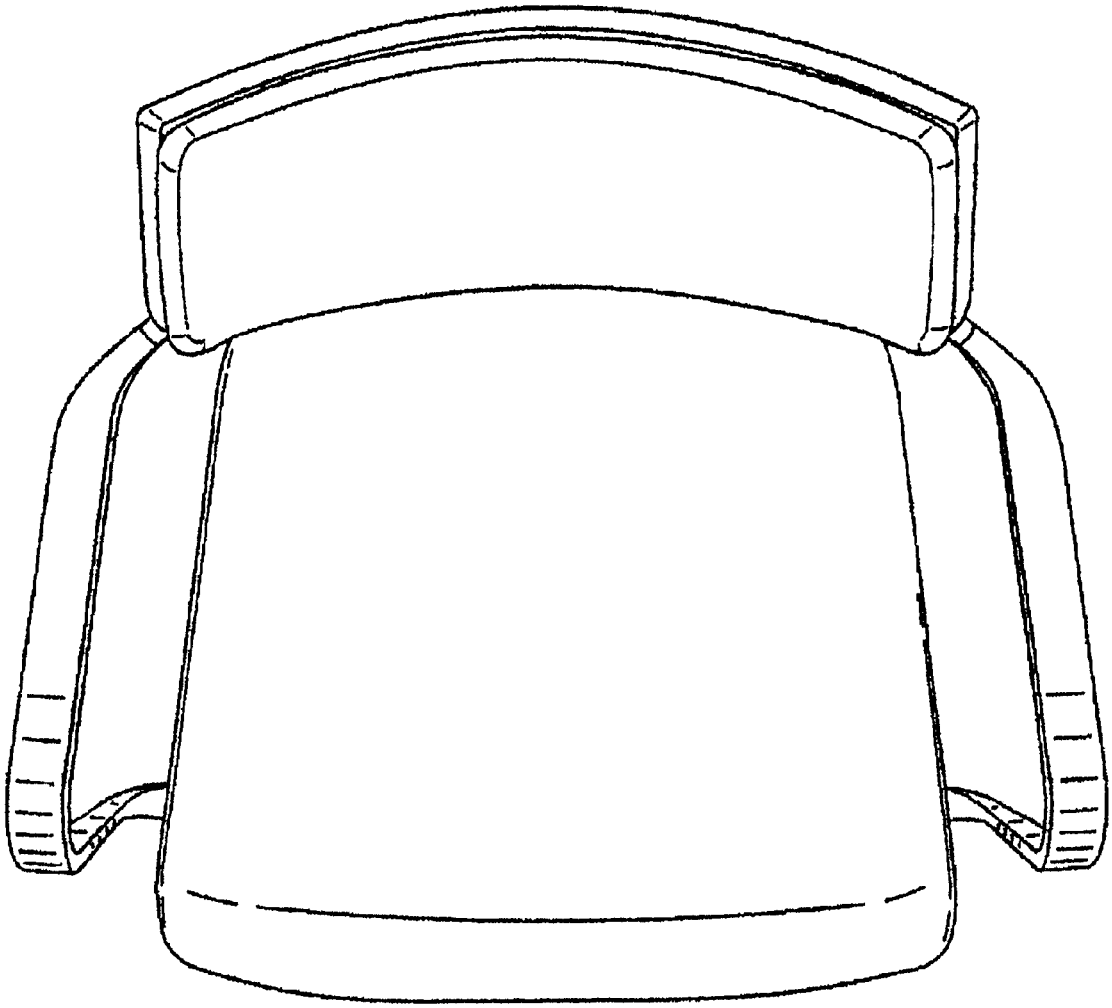
Figure 2:
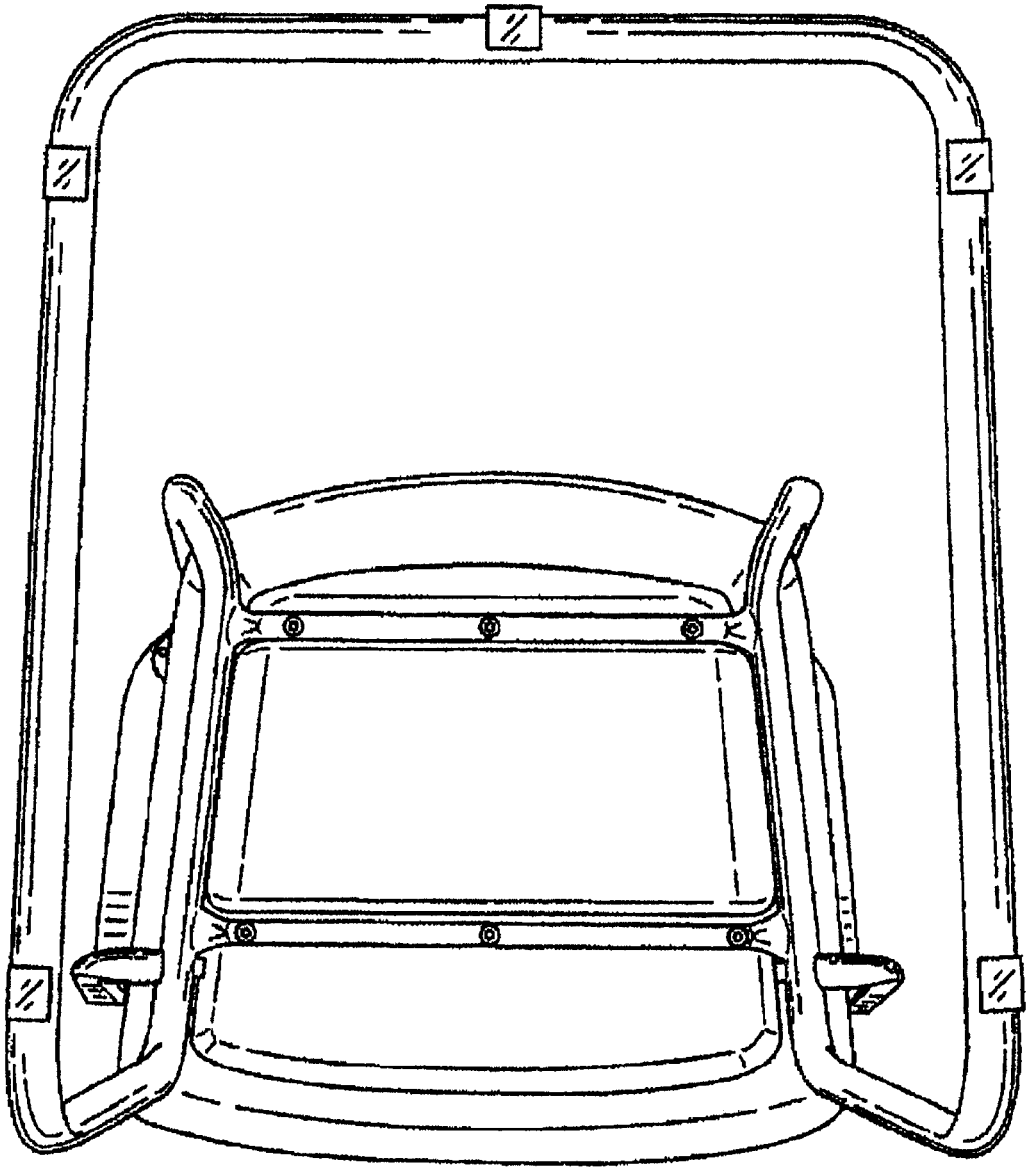
Figure 3:
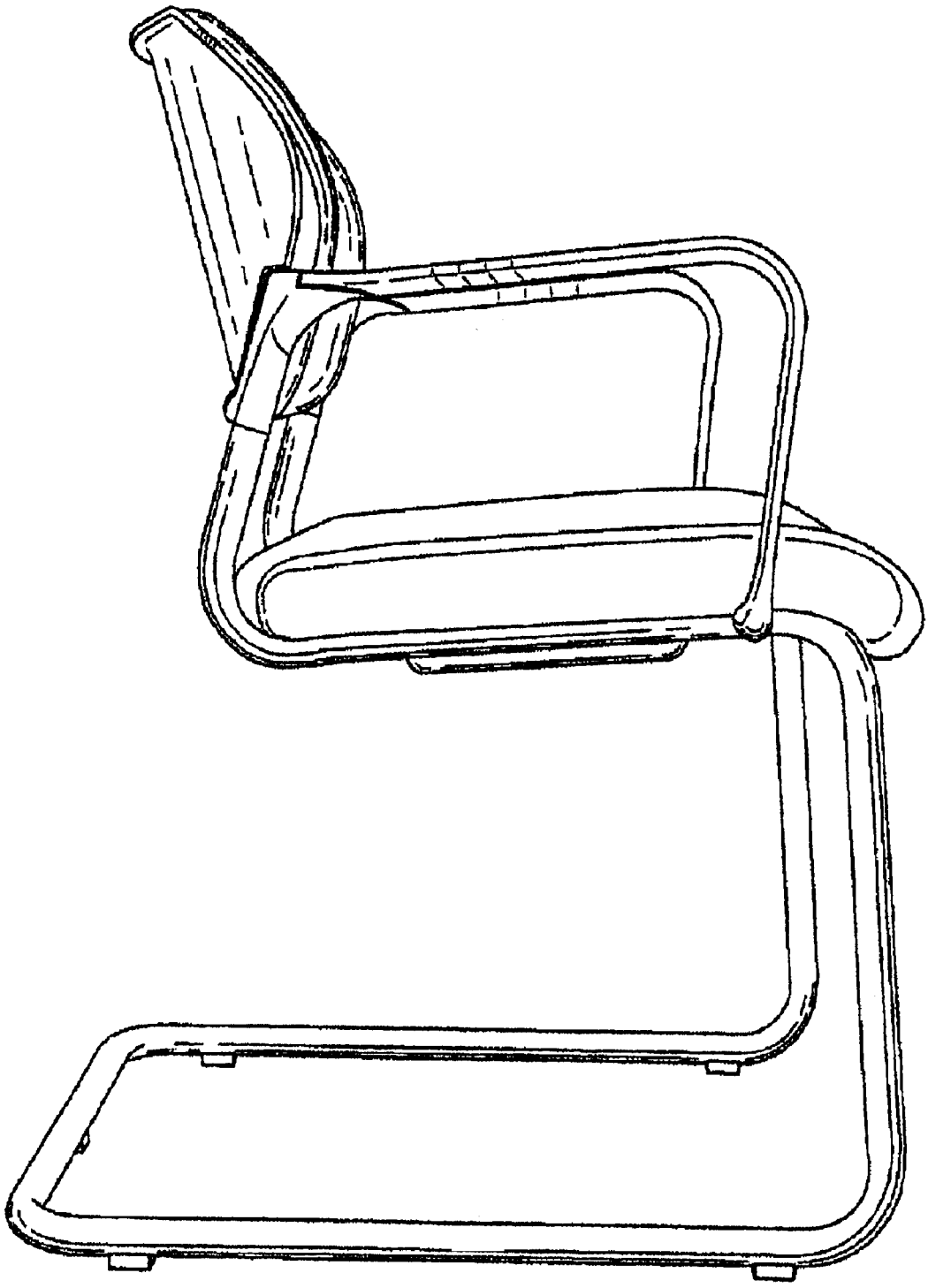
Figure 4:
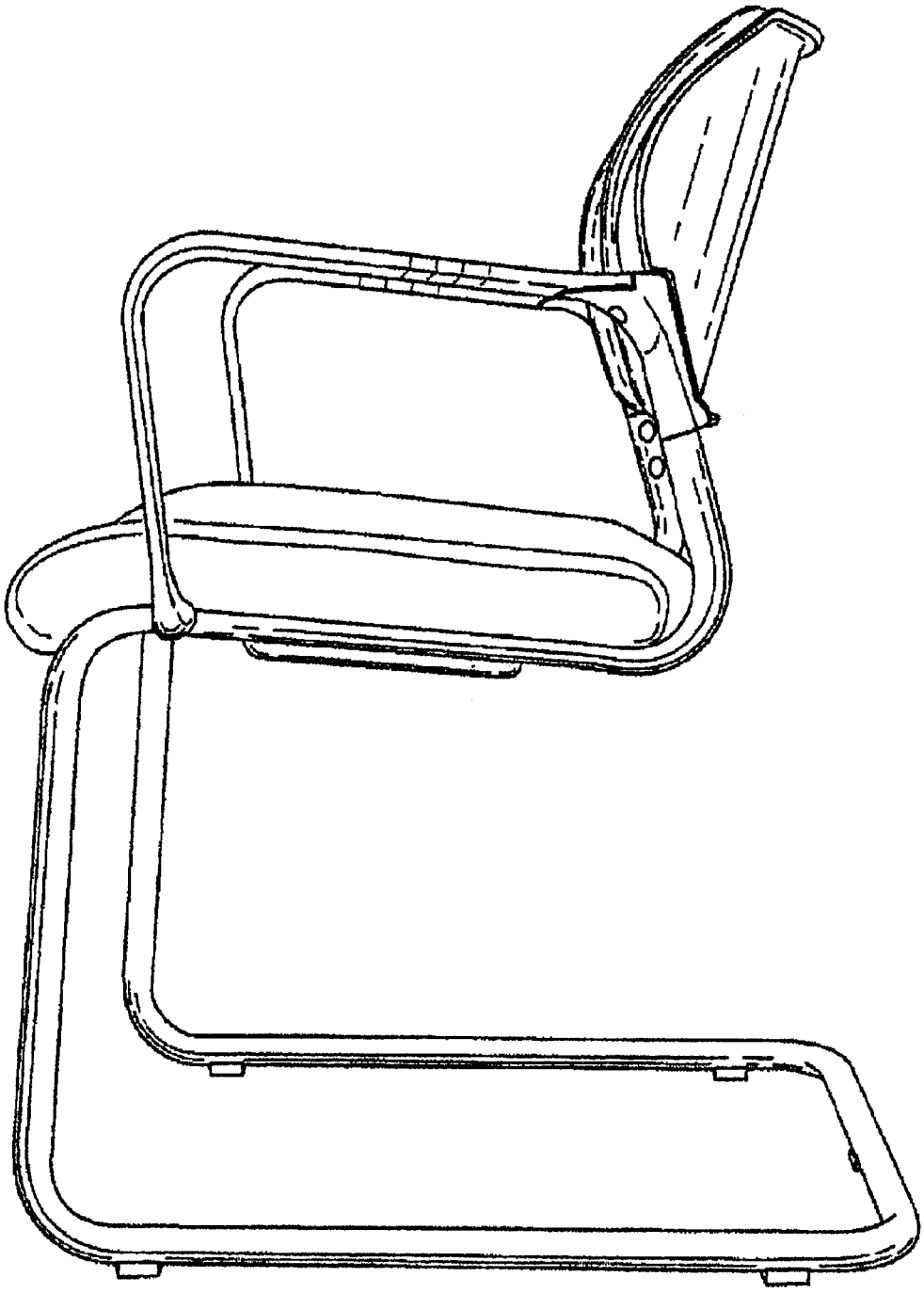
Figure 5:
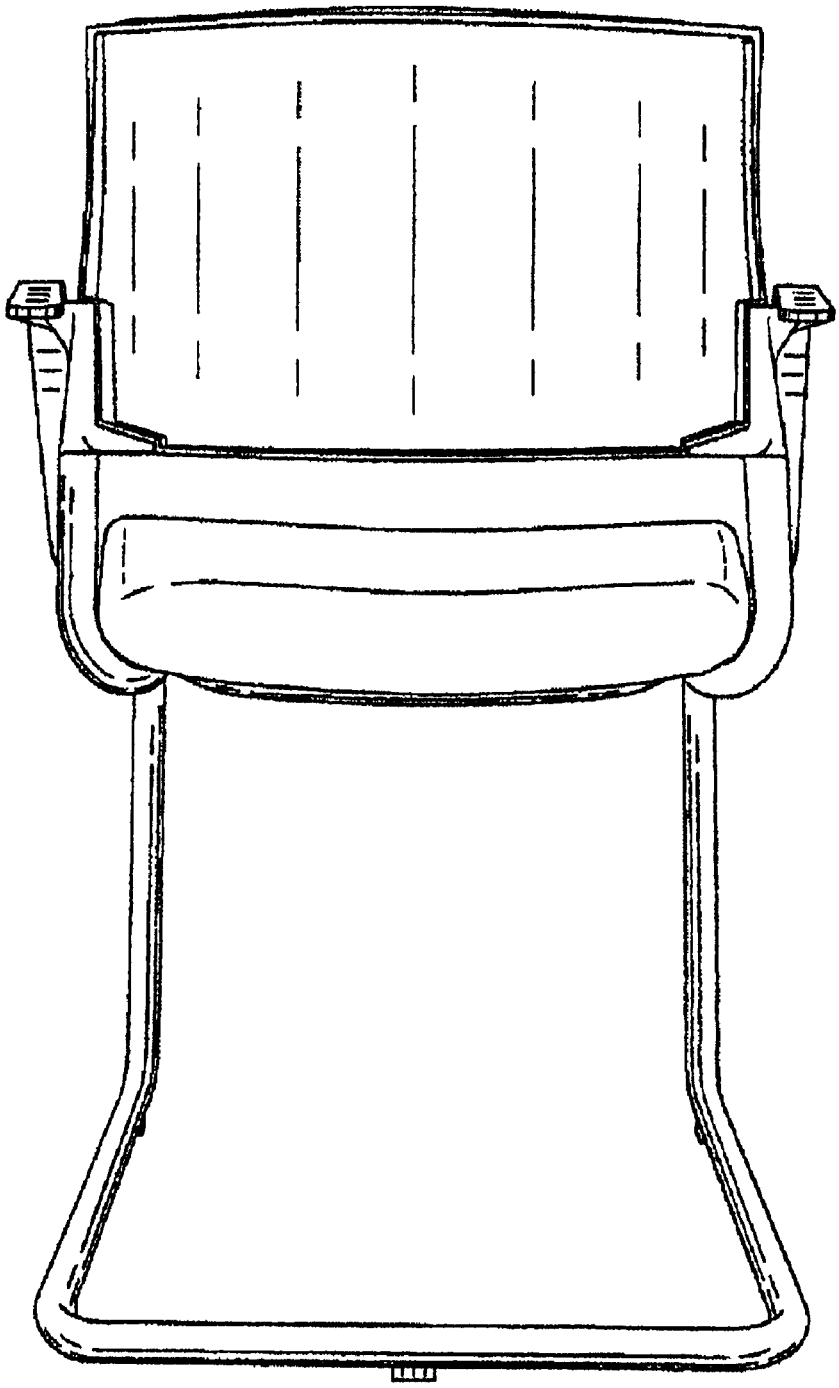
Figure 6:
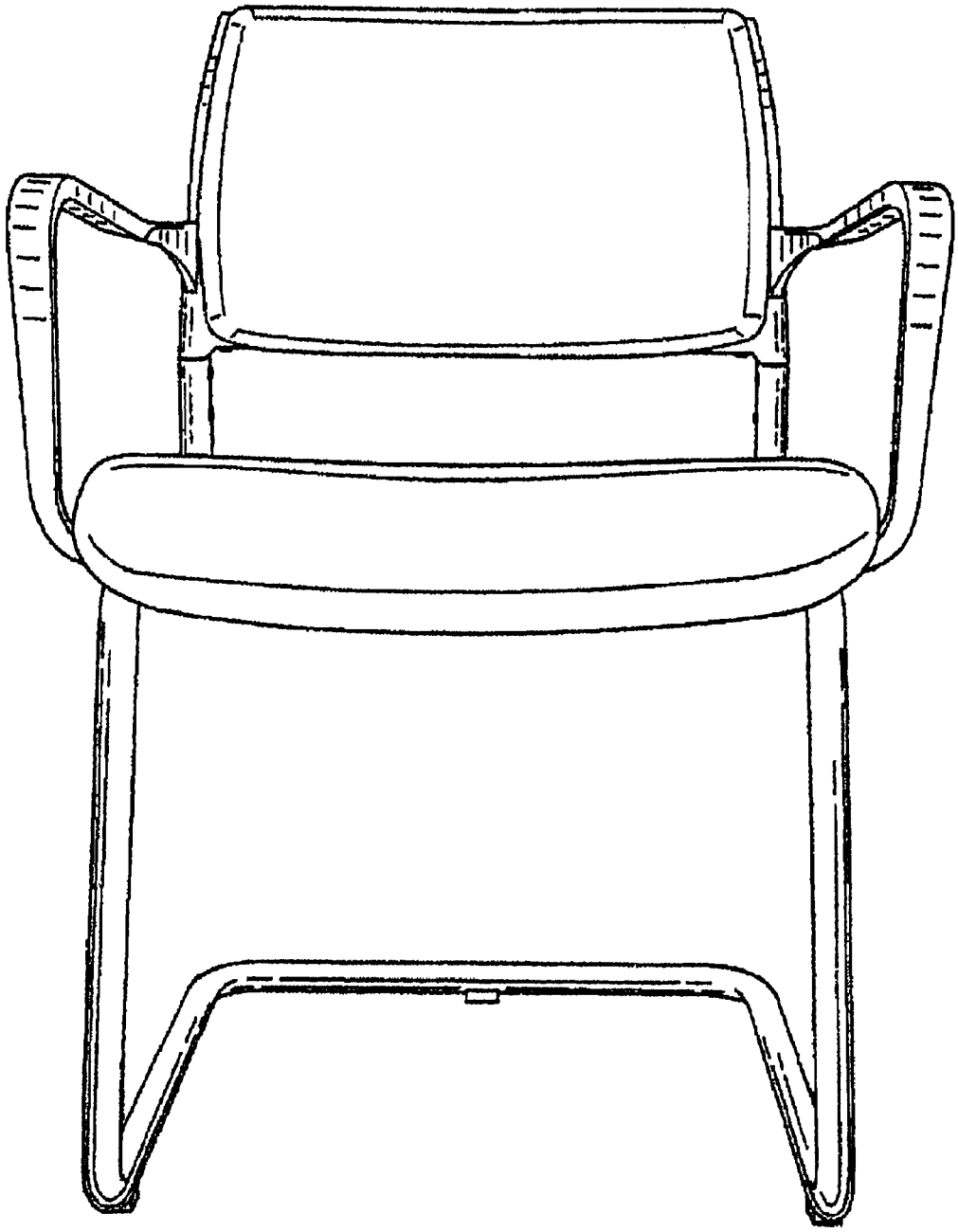
Figure 7:
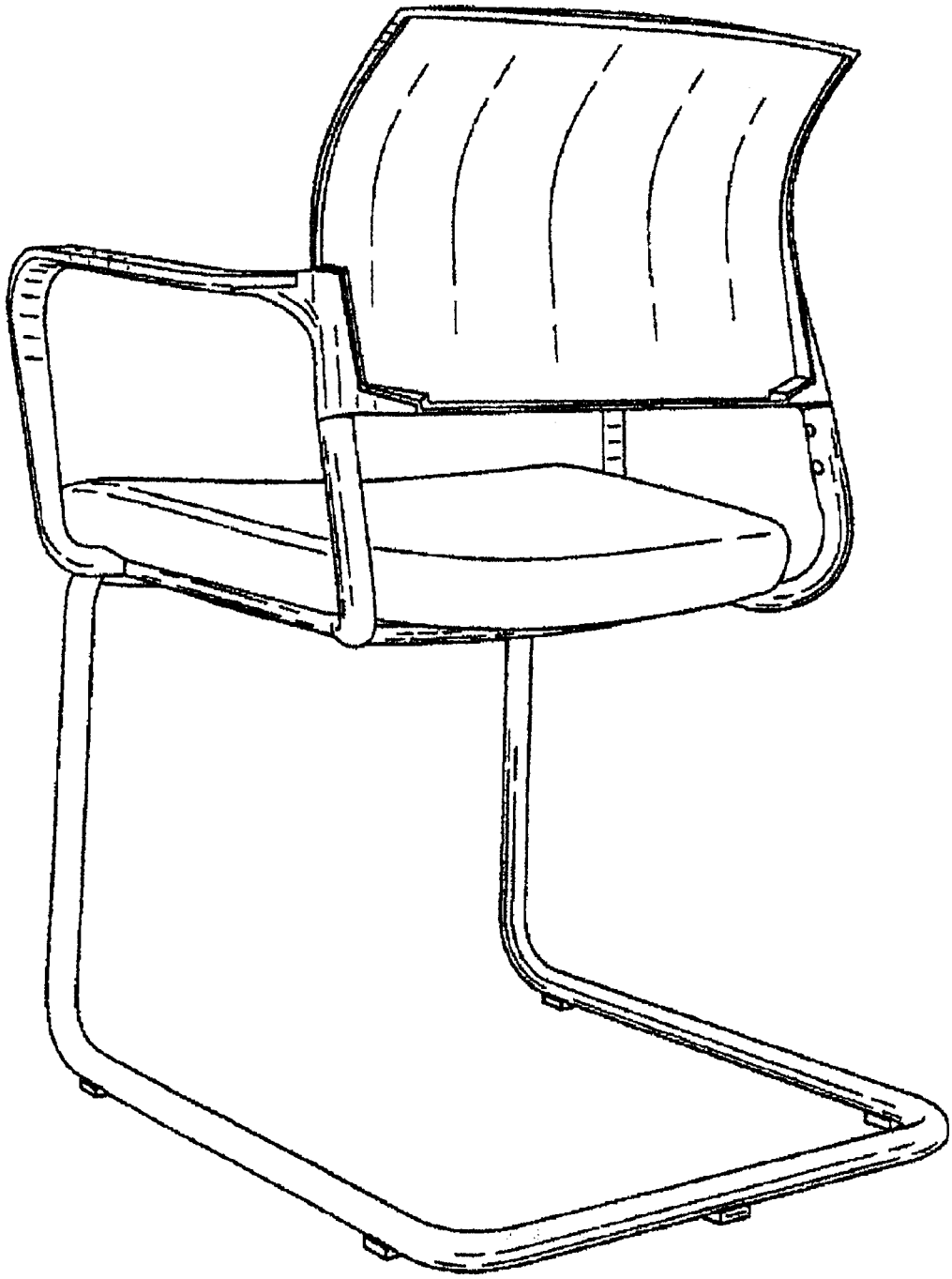

Matter enclosed in heavy brackets [ ] appears in the original patent, but forms no part of this reissue; matter printed in italics indicates the additions made by reissue.